(12) United States Patent
Dijkhuis et al.

(10) Patent No.: US 9,970,467 B2
(45) Date of Patent: May 15, 2018

(54) HANDHELD POWER TOOL

(71) Applicant: Hilti Aktiengesellschaft, Schaan (LI)

(72) Inventors: Arjen Detmer Dijkhuis, Feldkirch (AT); Patrick Scholz, Buchs (CH); Robert Meier, Feldkirch-Gisingen (AT); Peter Rickers, Sax (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days. days.

(21) Appl. No.: 15/105,187

(22) PCT Filed: Dec. 16, 2014

(86) PCT No.: PCT/EP2014/077941
§ 371 (c)(1),
(2) Date: Jun. 16, 2016

(87) PCT Pub. No.: WO2015/091465
PCT Pub. Date: Jun. 25, 2015

(65) Prior Publication Data
US 2016/0312812 A1 Oct. 27, 2016

(30) Foreign Application Priority Data
Dec. 19, 2013 (EP) ..................................... 13198324

(51) Int. Cl.
*F16B 13/06* (2006.01)
(52) U.S. Cl.
CPC .................. *F16B 13/065* (2013.01)
(58) Field of Classification Search
CPC ............................. F16B 13/065; F16B 13/066

USPC ....................... 411/49, 50–53, 55, 60.1, 60.2
See application file for complete search history.

(56) References Cited

U.S. PATENT DOCUMENTS

| 462,601 A | * | 11/1891 | Thinnes | ................ | F16B 13/066 |
| | | | | | 411/53 |
| 3,750,526 A | | 8/1973 | Lerich | | |
| 3,855,896 A | | 12/1974 | Kaufman | | |
| 4,158,983 A | * | 6/1979 | Amico | .................. | F16B 13/066 |
| | | | | | 403/349 |
| 4,640,654 A | | 2/1987 | Fischer et al. | | |
| (Continued) | | | | | |

FOREIGN PATENT DOCUMENTS

| CA | 953958 A1 | 9/1974 |
| CN | 88103419 | 12/1988 |
| (Continued) | | |

*Primary Examiner* — Flemming Saether
(74) *Attorney, Agent, or Firm* — Davidson, Davidson & Kappel, LLC

(57) ABSTRACT

An expansion anchor including a bolt and an expansion sleeve surrounding the bolt is provided, the bolt having: an expansion cone in the region of the front end of the bolt, which expansion cone radially enlarges the expansion sleeve when moved into same; a threaded section for introducing tensile forces into the bolt; a shoulder that limits a movement of the expansion sleeve away from the expansion cone; and at least one anti-rotation protrusion for inhibiting a rotation of the expansion sleeve in relation to the bolt, the protrusion originating at the shoulder and protruding radially outwards on the bolt. The axial length of the anti-rotation protrusion is smaller than the pitch of the threaded section arranged on the bolt.

7 Claims, 2 Drawing Sheets

(56) References Cited

U.S. PATENT DOCUMENTS

| | | | | |
|---|---|---|---|---|
| 4,797,044 A | * | 1/1989 | Velasco | F16B 13/065 |
| | | | | 411/45 |
| 4,943,195 A | | 7/1990 | Fischer | |
| 4,996,860 A | * | 3/1991 | Shinjo | B21H 3/022 |
| | | | | 470/11 |
| 5,176,481 A | | 1/1993 | Schiefer | |
| 5,211,512 A | * | 5/1993 | Frischmann | F16B 13/065 |
| | | | | 405/259.4 |
| 5,263,803 A | * | 11/1993 | Anquetin | F16B 13/00 |
| | | | | 411/31 |
| 5,569,091 A | * | 10/1996 | Haage | F16B 13/065 |
| | | | | 411/40 |
| 8,192,122 B2 | | 6/2012 | Gaudron et al. | |
| 2008/0213063 A1 | | 9/2008 | Pratt | |
| 2010/0111639 A1 | | 5/2010 | Gaudron | |

FOREIGN PATENT DOCUMENTS

| | | |
|---|---|---|
| CN | 2096670 U | 2/1992 |
| CN | 2296423 Y | 11/1998 |
| DE | 2161224 A1 | 6/1973 |
| DE | 2256822 A1 | 6/1974 |
| DE | 6610690 U | 8/1975 |
| DE | 3411285 A1 | 10/1985 |
| DE | 3508015 A1 | 9/1986 |
| DE | 4116149 A1 | 11/1992 |
| DE | 29501182 U1 | 3/1995 |
| DE | 10 2008 057 584 | 5/2010 |
| EP | 0 874 167 B1 | 10/1998 |
| EP | 0893610 A1 | 1/1999 |
| GB | 1414562 A | 11/1975 |
| JP | H06193151 | 7/1994 |
| JP | 2012507670 | 3/2012 |
| SU | 1303043 | 4/1987 |

* cited by examiner

HANDHELD POWER TOOL

The present invention relates to an expansion. Such an expansion anchor is equipped with a bolt and an expansion sleeve, which surrounds the bolt, the bolt having an expansion cone in the area of its front end, which expands the expansion sleeve radially when it is drawn into the expansion sleeve, the bolt having a threaded section, in particular in the area of its rear end, for introducing tensile forces into the bolt, the bolt having a shoulder, which delimits an in particular axially directed displacement of the expansion sleeve away from the expansion cone, and the bolt having at least one anti-twist protrusion for inhibiting a twisting of the expansion sleeve in relation to the bolt, in particular around the bolt longitudinal axis, the anti-twist protrusion originating from the shoulder and protruding radially outward on the bolt.

BACKGROUND

An expansion anchor is known, for example, from DE 4116149 A1. It is used for anchoring mounting parts to a borehole in a fixed substrate, for example, a concrete substrate. The known expansion anchor has an elongated bolt, which is provided with an expansion cone in the area of its front end, and which has a thread in the area of its rear end, on which a nut is seated. The expansion cone expands toward the front end, i.e., against the extraction direction. In the extraction direction, an expansion sleeve is situated on the bolt offset to the expansion cone. Toward the front end of the bolt on the expansion cone, this expansion sleeve is displaceably mounted on the bolt. Toward the rear end of the bolt, the displacement of the expansion sleeve in relation to the bolt is delimited by a stop formed as an annular shoulder.

When setting the anchor, the first end of the bolt is pounded into the borehole in the substrate against the extraction direction. The expansion sleeve is entrained by the annular shoulder and therefore also reaches the borehole. The nut is then screwed on until it stops on the substrate or a mounting part, which may be present as an abutment, and it is then tightened further until a predefined torque is reached. This tightening of the nut causes the bolt to be pulled back out of the borehole to a certain extent in the extraction direction. After the expansion anchor is pounded in, the expansion sleeve is caught on the inner borehole wall and is therefore retained upon withdrawal of the bolt in the borehole. As a result, the expansion cone of the bolt is drawn into the expansion sleeve, the expansion sleeve being expanded due to the increasing diameter of the expansion cone. The expansion anchor is jammed with the expansion sleeve in the substrate, so that tensile loads may be transferred into the substrate. This basic principle may preferably also be used in the anchor according to the present invention.

When expansion anchors are used under actual surrounding conditions, sand or drill cuttings may possibly reach the thread of the bolt, which may result in an undesirable increase of the friction between nut and bolt, and thus an increase of the required torque for tightening the nut. In extreme cases, the friction of the nut on the thread may exceed the friction of the bolt in the expansion sleeve. In this case, an undesirable jamming between nut and bolt may occur. The bolt then slips in the sleeve so that the nut may not be screwed on and the anchor may not be set easily.

To prevent such slippage, i.e., to prevent such undesirable rotation of the bolt in relation to the sleeve, the most proximate U.S. Pat. No. 3,855,896 A proposes the provision of a knurling on the circumference of the bolt, starting from the annular shoulder, which acts against the expansion sleeve from within, and increases the friction between the bolt and sleeve.

DE 2256822 A1 also concerns anti-twist devices of the expansion sleeve on the bolt. In contrast to U.S. Pat. No. 3,855,896A, in which the anti-twist device is implemented by increased friction, DE 2256822 A1 proposes anti-twist devices by appropriate geometric shapes, i.e., form-locked anti-twist devices.

Additional expansion anchors having anti-twist devices between the expansion sleeve and bolt are described in DE 29501182 U1, DE 3411285 A1, GB 1414562 A, CA 953958 A1, DE 2161224 A1, U.S. Pat. No. 3,750,526 A, EP 0 874 167 B1 and DE 6610690 U.

According to EP 0893610 A1, an anti-twist protection of the bolt is implemented by webs projecting radially from the bolt, the webs acting directly against the borehole wall.

DE 10 2008 057 584 A1 describes an expansion anchor, in the neck area of which at least three reinforcing ribs are situated, which extend to the stop shoulder, and which are intended to be used for releasing tensions, in particular in the case of transverse stress.

According to DE 3508015 A1, the stop area located perpendicular to the longitudinal axis of the bolt and formed on the shoulder for the sleeve merges via a concave fillet into the lateral surface of the cylindrical neck area of the bolt, which is intended to avoid the occurrence of a sharp edge having a tendency to break.

SUMMARY OF THE INVENTION

It is an object of the present invention to provide a particularly reliable, in particular reliable to install, expansion anchor having particularly good load values, which is at the same time also particularly simple to manufacture.

An expansion anchor according to the present invention is characterized in that axial length I of the anti-twist protrusion is smaller than double the pitch p of the threaded section situated on the bolt. Preferably, axial length I of the anti-twist protrusion is smaller than pitch p of the threaded section situated on the bolt. Consequently, at least the following applies:

$$I < 2 \times p$$

and preferably:

$$I < p.$$

A basic idea of the present invention may be seen in designing the anti-twist protrusion, which, on the rear end area of the expansion sleeve, acts in a frictional manner, for example, from within, against the expansion sleeve, so that the anti-twist protrusion loses operative contact with the expansion sleeve already immediately after the beginning of the extraction of the bolt from the borehole when setting the anchor. The present invention has on the one hand recognized that an anti-twist device is frequently no longer required after the beginning of the expansion process of the expansion sleeve. This is due to the fact that as soon as the expansion sleeve is radially expanded by the expansion cone and pressed against the borehole wall, the radial contact pressure and consequently the friction between the expansion sleeve and bolt increases very strongly, so that from this point in time, an anti-twist protection device is usually no longer required between the bolt and the expansion sleeve. The present invention has further recognized that an anti-twist device may even be disadvantageous under certain circumstances during the expansion process when setting the anchor and in the subsequent loaded state of the anchor. Thus, for example, a simple friction-based anti-twist protection increases not only the friction in the circumferential direction, but also the friction in the axial direction. This may on the one hand encumber the expansion process. On the other hand, it may encumber an advantageous subsequent expansion of the sleeve of the completely installed anchor and/or a sliding back and forth of the expansion cone in the sleeve of the completely installed anchor, for example, in the case of cyclically opening and closing concrete cracks. Furthermore, simple anti-twist devices may also result in undesirable punctiform or linear load of the sleeve. Based on these findings, the present invention proposes a particular anti-twist device that acts only at the beginning of the setting process and quickly decouples as soon as the expansion of the sleeve has begun. Accordingly, the anti-twist device is only effective when it is actually needed, while there is no longer an effect in the state of the anchor in which it may be potentially disadvantageous.

This only temporary effect of the anti-twist device is achieved on the one hand in that the anti-twist protrusion originates from the shoulder, which means that the anti-twist protrusion directly adjoins the shoulder, and, on the other hand that the axial extent of the anti-twist protrusion is very small, the axial extension lying in particular in the order of the pitch of the thread. Due to this dimensioning, the anti-twist protrusion acts against the sleeve only immediately at the beginning of the setting process. As soon as the nut is tightened by approximately one turn, the anti-twist protrusion decouples from the expansion sleeve and is no longer able to encumber the further expansion process. Consequently, the advantages of an anti-twist device may be achieved without having to accept its potential disadvantages. According to the present invention, this advantage may also be achieved by particularly low manufacturing costs. Since according to the present invention, the anti-twist protrusion directly adjoins the shoulder, it may be formed together with the shoulder in a particularly simple manufacturing method, for example, by upsetting.

As is standard practice, the pitch may be understood to be in particular the distance between two thread stages, in particular of the same thread turn, along the longitudinal axis of the bolt, i.e., the axial path which is covered by one turn of the threaded section and/or one turn of the nut on the threaded section. The bolt may also have, in particular axially offset from the threaded section, additional threaded sections. If additional threaded sections are present, the threaded section, the pitch of which is relevant here, may be in particular the one on which the nut is situated.

According to the present invention, the expansion sleeve is situated, in particular attached, displaceably along the bolt. To the extent "radial," "axial," and "circumferential direction" are discussed in this description text, this may relate in particular to the longitudinal axis of the bolt, which may be in particular the axis of symmetry and/or center axis of the bolt. The expansion anchor may be in particular a heavy-duty expansion anchor. The expansion sleeve and/or the bolt are suitably made from a metal material which, for example, may also be coated for selectively influencing the friction.

According to the present invention, the expansion cone may be drawn into the expansion sleeve by a joint axial movement of the bolt and the expansion cone in relation to the expansion sleeve. For this purpose, the expansion cone is fittingly situated fixedly on the bolt, at least in the axial direction. Preferably, the expansion cone is formed integrally with the bolt. The expansion anchor according to the present invention may preferably also be denoted as a bolt anchor.

According to the present invention, the expansion sleeve may be pushed radially outward by the inclined surface of the expansion cone and pressed against the borehole wall in the substrate, if the expansion cone is offset relative to the expansion sleeve in the extraction direction of the bolt. This anchors the expansion anchor in the borehole wall. Preferably, the extraction direction runs in parallel to the longitudinal axis of the bolt and/or points out of the borehole. Advantageously, the distance of the surface of the expansion cone from the longitudinal axis of the bolt increases opposite to the extraction direction, i.e., as the distance from the threaded section increases. The surface of the expansion cone may be strictly conical. However, according to the standard practice definition of an expansion cone, this does not have to be the case. For example, the surface of the expansion cone may also be convex or concave in the longitudinal section.

The shoulder forms a rear stop for the expansion sleeve, which delimits a displacement of the expansion sleeve away from the expansion cone, i.e., a displacement of the expansion sleeve in the extraction direction. The shoulder preferably has an annular or at least interrupted annular stop surface for the expansion sleeve, it being preferably possible for the stop surface to run perpendicular to the longitudinal axis of the bolt. Advantageously, the shoulder is situated axially between the expansion cone and the threaded section and/or axially between the expansion sleeve and the threaded section. Preferably, the bolt has an annular collar, which surrounds the bolt, it being possible for the collar to be formed in particular integrally with the bolt, and/or forming an at least local maximum cross section point on the bolt, the shoulder on which the expansion sleeve stops being formed on the front side of the collar.

The anti-twist protrusion is preferably formed integrally with the bolt, which may be advantageous with respect to manufacturing. According to the present invention, the anti-twist protrusion originates from the shoulder, in particular from the stop surface formed on the shoulder for the expansion sleeve, which may include in particular that it projects axially from the shoulder and/or the stop surface and/or immediately merges into the shoulder and/or the stop surface.

It is particularly advantageous that the axial length of the anti-twist protrusion is smaller than 0.1 times the maximum axial extension of the expansion sleeve, that the axial length of the anti-twist protrusion is smaller than the maximum thickness of the expansion sleeve, and/or that the axial length of the anti-twist protrusion is smaller than 0.1 times the maximum diameter of the bolt. According to these variants, anti-twist protrusions may be obtained, which decouple from the expansion sleeve at the beginning of the expansion process in a particularly reliable manner. The diameter of the bolt is advantageously measured perpendicular to its longitudinal axis.

Furthermore, it is particularly advantageous that the anti-twist protrusion, acts in particular at least partially in a frictional manner, against the inside of the expansion sleeve, which faces the bolt, in particular faces it radially. According to this specific embodiment, the expansion sleeve covers the anti-twist protrusion, at least partially radially outward, in particular after the anchor is pounded into the borehole and/or at the beginning of the expansion process. This may be implemented in a particularly simple manner with respect to manufacturing, for example, by simply wrapping the bolt using a metal strip. Furthermore, the anti-twist protrusion may also be used in this case for an initial centering of the expansion sleeve. For a pure form-locked connection or for a combined friction-fit and form-locked connection, a radially directed indentation may be provided in the inside of the expansion sleeve, in which the anti-twist protrusion is accommodated. The inside of the expansion sleeve may, however, also be smooth in the area of the anti-twist protrusion. The inside of the expansion sleeve, against which the anti-twist protrusion acts, is formed in particular in the shape of a sleeve and/or at least approximately in the shape of a cylinder and/or faces the neck area of the bolt. An at least partially friction-based anti-twist protection is present between the expansion sleeve and the bolt preferably due to the anti-twist protrusion. This may in particular include that the anti-twist protrusion presses radially from the inside against the expansion sleeve, so that a rotational movement of the sleeve in relation to the anti-twist protrusion around the longitudinal axis of the bolt causes a friction between the surface of the anti-twist protrusion and the inner surface of the expansion sleeve.

Preferably, the maximum measured height of the anti-twist protrusion measured in the axial direction is smaller than the pitch of the threaded section situated on the bolt. This may be advantageous with respect to manufacturing, since the required degree of deformation is relatively small.

Another preferred specific embodiment of the present invention is that the bolt has at least one additional anti-twist protrusion. This makes it possible to increase the reliability of the anti-twist device further. Furthermore, multiple anti-twist protrusions make it possible to center the expansion sleeve in relation to the bolt in a particularly simple manner, so that particularly well defined force ratios prevail at the beginning of the expansion process. Preferably, a total of at least three anti-twist protrusions may be provided. In this configuration, at the beginning of the expansion process, it is possible to focus the friction on the anti-twist protrusions in a particularly simple manner, which may increase the reliability even further. If multiple anti-twist protrusions are provided, the features, which are named in this description in connection with one anti-twist protrusion, are applicable to a single anti-twist protrusion, to a part of the anti-twist protrusions or to all anti-twist protrusions. If multiple anti-twist protrusions are provided, they may be situated in particular equidistantly on the circumference of the bolt.

Furthermore, it may be provided that the expansion sleeve has at least one slot, which in particular runs axially. This slot may make the expansion process easier. This slot may separate two adjacent expansion segments. If a slot is provided, the bolt may have a locking protrusion, which engages with the slot. In this case, an additional anti-twist device may be present, which acts in a form-locked manner. The slot preferably extends to the front end and/or to the rear end of the expansion sleeve.

According to the present invention, the threaded section may be in particular a male threaded section. This may be advantageous with respect to manageability. The threaded section is used preferably for introducing tensile forces, which are directed in the extraction direction, into the bolt. In particular, the direction vector of the extraction direction may be directed from the expansion cone to the threaded section.

Another preferred specific embodiment of the present invention lies in that a nut having a thread corresponding to the threaded section, in particular a female thread, is situated on the threaded section. This nut may be used for attaching the mounting part and for drawing the bolt including the expansion cone into the expansion sleeve. The nut is in particular rotatably situated on the threaded section around the longitudinal axis of the bolt. The threaded section, the pitch of which is relevant according to the present invention, may in particular lie in the inside of the nut.

BRIEF DESCRIPTION OF THE DRAWINGS

The present invention will be elucidated in greater detail in the following based on preferred exemplary embodiments, which are schematically shown in the appended drawings, it being possible in principle to implement individual features of the exemplary embodiments shown below in connection with the present invention individually or in any combination.

DETAILED DESCRIPTION

Figure 1:
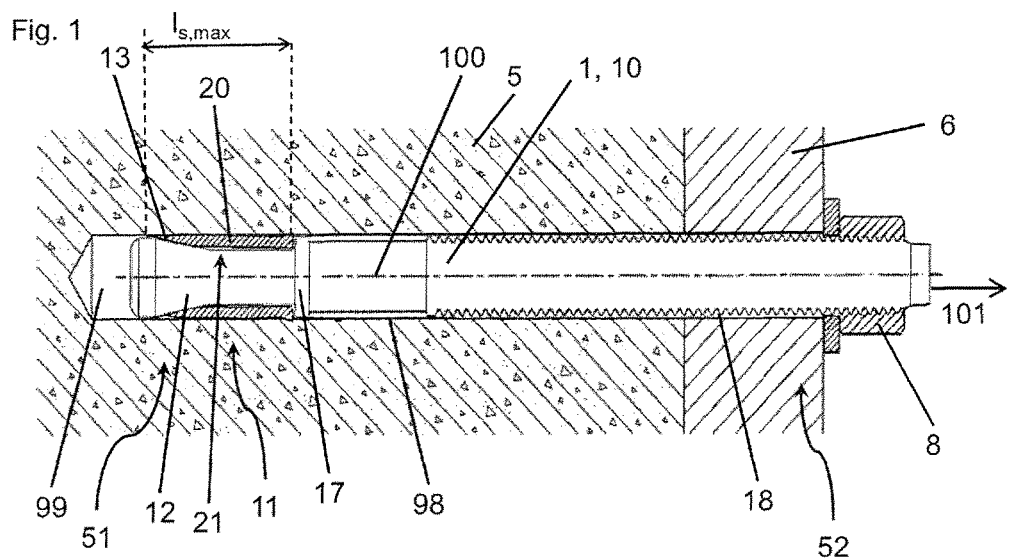
FIG. 1 shows a partial longitudinal sectional view of an expansion anchor according to a first specific embodiment set in a concrete substrate.

The figures show one exemplary embodiment of an expansion anchor 1 according to the present invention. Expansion anchor 1 has a bolt 10 and an expansion sleeve 20, expansion sleeve 20 surrounding bolt 10 annularly. In the area of its front end 51, bolt 10 has an expansion cone 12 for expansion sleeve 20, which is adjoined continuously rearward by a neck area 11. Expansion cone 12 is fixedly situated on bolt 10 and is preferably formed integrally with bolt 10.

In neck area 11, bolt 10 has an essentially constant, preferably cylindrical, cross section. On adjoining expansion cone 12, the surface of bolt 10 is formed as an inclined surface 13, and the diameter of bolt 10 increases toward first end 51, i.e., bolt 10 widens on expansion cone 12, starting from neck area 11 toward its front first end 51. Inclined surface 13 on expansion cone 12 may be conical in the strict mathematical sense; however, this is not required.

On the side of neck area 11 facing away from expansion cone 12, bolt 10 has a stop for expansion sleeve 20 designed as an annular shoulder 17. In the area of its rear end 52, the bolt has a threaded section 18 designed as a male threaded section for introducing tensile forces into bolt 10. On this threaded section 18 sits a nut 8.

Figure 2:
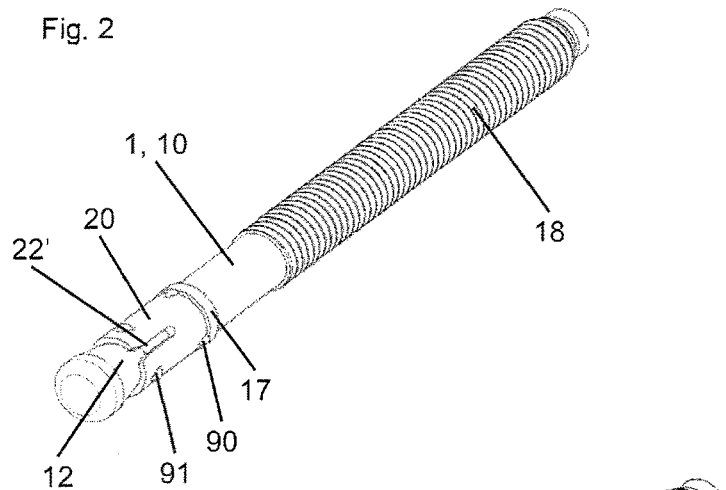
FIG. 2 shows a perspective view of the bolt of the anchor from FIG. 1 including an expansion sleeve.
Figure 6:
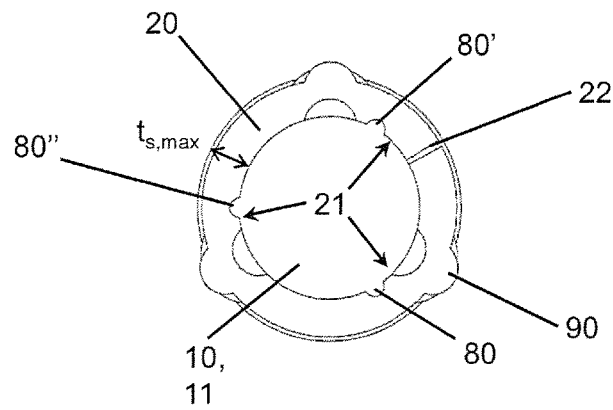
FIG. 6 shows a cross-sectional view A-A according to FIG. 5 of the bolt of the anchor from FIG. 1 including an expansion sleeve.

As FIGS. 2 and 6 show in particular, expansion sleeve 20 has axially extending slots 22 and 22', which facilitate the expansion of expansion sleeve 20.

When expansion anchor 1 is set, front end 51 of bolt 10 is pushed through a mounting part 6 in the direction of longitudinal axis 100 of bolt 10 into a borehole 99 in substrate 5 of FIG. 1. Due to shoulder 17, which delimits a displacement of expansion sleeve 20 away from expansion cone 12, expansion sleeve 20 is also introduced into borehole 99. Bolt 10 is then pulled out of borehole 99 again for a short distance in extraction direction 101 which runs in parallel to longitudinal axis 100 by tightening nut 8 which is in contact with mounting part 6. Due to its friction against essentially cylindrical wall 98 of borehole 99, expansion sleeve 20 remains in borehole 99 and consequently a displacement of bolt 10 in relation to expansion sleeve 20 occurs. During this displacement, inclined surface 13 of expansion cone 12 of bolt 10 penetrates deeper and deeper into expansion sleeve 20, so that expansion sleeve 20 is radially expanded in the area of its front end by inclined surface 13 and pressed to wall 98 of borehole 99. This mechanism fixes expansion anchor 1 in substrate 5. The set condition of expansion anchor 1, in which it is fixed in substrate 5, is shown in FIG. 1.

Figure 3:
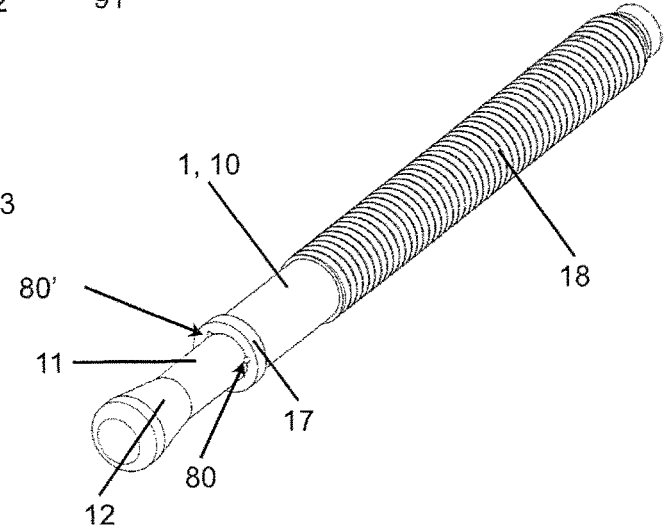
FIG. 3 shows a perspective view of the bolt of the anchor from FIG. 1 without an expansion sleeve.
Figure 5:
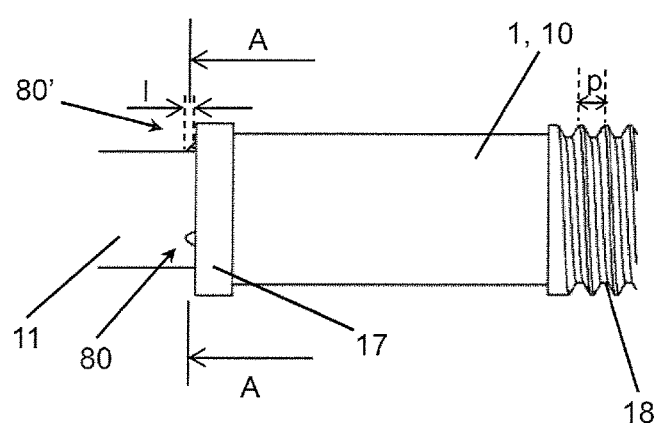
FIG. 5 shows a side view of the bolt of FIG. 1 in section X of FIG. 4.

As FIGS. 3, 5 and 6 show in particular, bolt 10 has three anti-twist protrusions 80, 80' and 80". Anti-twist protrusions 80, 80' and 80" are situated in neck area 11 of bolt 10 and originate from shoulder 17, i.e., they directly adjoin shoulder 17. As FIG. 6 shows in particular, anti-twist protrusions 80, 80' and 80" are situated equidistantly around the circumference of bolt 10 as viewed in the cross section of bolt 10. As is further indicated in FIG. 6, anti-twist protrusions 80, 80' and 80" press radially from within against approximately cylindrical inside 21 of expansion sleeve 20. In this way, they provide increased friction between expansion sleeve 20 and bolt 10 and thus counteract an undesirable slippage of bolt 10 in expansion sleeve 20 during setting of the anchor. Depending on the embodiment, anti-twist protrusions 80, 80' and 80" act exclusively superficially or are pressed more or less deeply into expansion sleeve 20 in order to achieve a mixed form-locked and friction-fit rotational coupling.

As is apparent in particular in FIG. 5, axial length I of anti-twist protrusions 80, i.e., their maximum extension in the direction of longitudinal axis 100 is smaller than pitch p of threaded section 18, i.e., $I<p$.

Thus, anti-twist protrusions 80 act only at the very beginning of the setting process and decouple from expansion sleeve 20 as soon as the expansion process has progressed and expansion sleeve 20 has been displaced a short distance from shoulder 17 toward expansion cone 12. In particular, this may ensure that anti-twist protrusions 80 do not interfere with the interaction between expansion sleeve 20 and expansion cone 12 when the anchor is set.

Figure 4:
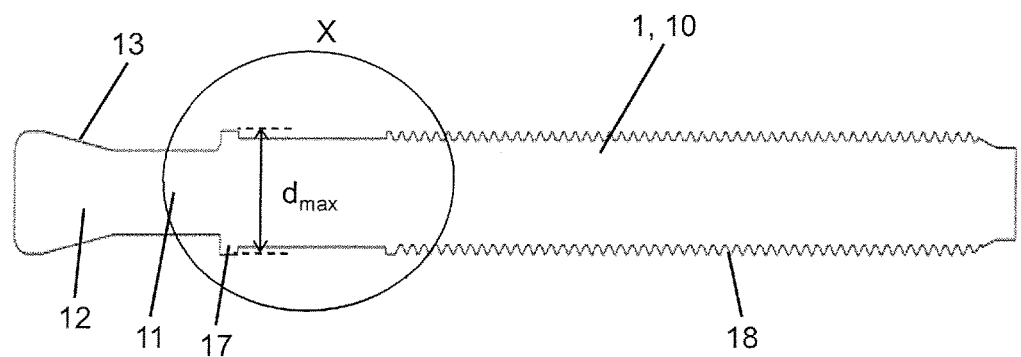
FIG. 4 shows a longitudinal sectional view of the bolt of the anchor from FIG. 1.

In another approach, axial length I of anti-twist protrusions 80 may be smaller than 0.1 times the maximum diameter $d_{max}$ of bolt 10, which may be present in particular on shoulder 17, as FIG. 4 shows. In another approach, axial length I of anti-twist protrusions 80 may be smaller than the 0.1 times the maximum axial extension $I_{s,max}$ of expansion sleeve 20, which is indicated in FIG. 1. In yet another approach, axial length I of anti-twist protrusions 80 may be smaller than maximum thickness $t_{s,max}$ of expansion sleeve 20 measured perpendicular to longitudinal axis 100, which is indicated in FIG. 6.

As shown in particular in FIGS. 2 and 6, expansion sleeve 20 may have outside protrusions 90 and 91 for better anchoring at borehole wall 98. These may, for example, be designed as radial indentations, so that, as may be seen in FIG. 6, corresponding recesses may be formed on inside 21 of expansion sleeve 20.

What is claimed is:

1. An expansion anchor comprising:
a bolt having a front end; and
an expansion sleeve surrounding the bolt,
the bolt having an expansion cone in an area of the front end, the expansion cone expanding the expansion sleeve radially, when the expansion cone is drawn into the expansion sleeve,
the bolt having a threaded section for introducing tensile forces into the bolt, the threaded section having a pitch,
the bolt having a shoulder delimiting a displacement of the expansion sleeve away from the expansion cone, and
the bolt having at least one anti-twist protrusion for inhibiting a twisting of the expansion sleeve in relation to the bolt, the anti-twist protrusion originating from the shoulder and the anti-twist protrusion projecting radially outward on the bolt,
an axial length of the anti-twist protrusion being smaller than double the pitch.

2. The expansion anchor as recited in claim 1 wherein:
the axial length of the anti-twist protrusion is smaller than the pitch,
the axial length of the anti-twist protrusion is smaller than 0.1 times a maximum axial extension of the expansion sleeve,
the axial length of the anti-twist protrusion is smaller than a maximum thickness of the expansion sleeve, or
the axial length of the anti-twist protrusion is smaller than 0.1 times a maximum diameter of the bolt.

3. The expansion anchor as recited in claim 2 wherein the anti-twist protrusion acts against an inside of the expansion sleeve facing the bolt.

4. The expansion anchor as recited in claim 2 wherein the bolt has at least one additional anti-twist protrusion.

5. The expansion anchor as recited in claim 2 wherein the threaded section is a male threaded section.

6. The expansion anchor as recited in claim 2 further comprising a nut having a thread corresponding to the threaded section, the nut being situated on the threaded section.

7. The expansion anchor as recited in claim 2 wherein the bolt includes a neck area between the expansion cone and the shoulder, the anti-twist protrusion projecting radially outward from the neck area and projecting axially with respect to the shoulder.

* * * * *

UNITED STATES PATENT AND TRADEMARK OFFICE
CERTIFICATE OF CORRECTION

PATENT NO. : 9,970,467 B2  
APPLICATION NO. : 15/105187  
DATED : May 15, 2018  
INVENTOR(S) : Arjen Detmer Dijkhuis et al.

Page 1 of 1

It is certified that error appears in the above-identified patent and that said Letters Patent is hereby corrected as shown below:

On the Title Page

Title (54) should read:  
EXPANSION ANCHOR INCLUDING AN ANTI-TWIST DEVICE

Signed and Sealed this  
Eleventh Day of September, 2018

Andrei Iancu  
*Director of the United States Patent and Trademark Office*